United States Patent [19]

Kelley

[11] Patent Number: 4,979,248
[45] Date of Patent: Dec. 25, 1990

[54] AIR SUSPENSION BED FOR VEHICLES

[75] Inventor: Jesse B. Kelley, Searcy, Ark.

[73] Assignee: John May, Lake Jackson, Tex.

[21] Appl. No.: 380,150

[22] Filed: Jul. 14, 1989

[51] Int. Cl.⁵ .............................................. A47C 19/00
[52] U.S. Cl. ..................................... 5/118; 254/10 R; 248/585; 296/190
[58] Field of Search ........................... 5/118; 296/190; 254/2 R, 2 C, 10 R, 10 B, 10 C, 124; 105/316; 248/585; 114/192

[56] References Cited

U.S. PATENT DOCUMENTS

| | | | |
|---|---|---|---|
| 623,669 | 4/1899 | Hooper et al. | 254/10 C |
| 2,512,150 | 6/1950 | Geren | 254/10 C |
| 2,545,515 | 3/1951 | Gannet et al. | 254/10 C |
| 2,906,497 | 9/1959 | Wolf | 254/10 B |
| 3,117,765 | 1/1964 | Chiuzzi | 254/10 C |
| 3,298,654 | 1/1967 | Dome | 248/585 |
| 3,951,373 | 4/1976 | Swenson et al. | 248/585 |
| 4,194,716 | 3/1980 | Barecki et al. | 248/575 |
| 4,497,078 | 2/1985 | Vogel et al. | 5/118 |
| 4,541,134 | 9/1985 | Black et al. | 5/118 |
| 4,848,732 | 7/1989 | Rossato | 254/10 R |

Primary Examiner—Alexander Grosz
Attorney, Agent, or Firm—Richards, Medlock & Andrew

[57] ABSTRACT

An air suspension bed is disclosed which is structured for installation in a vehicle and comprises a frame which is configured to hold a cushion. Two fluid suspension units include air bag assemblies and an upper housing unit and a lower housing unit with the upper housing unit being connected to the frame by mounting members, connecting members and resilient devices. The mounting members are generally U-shaped members which are fixedly attached to the frame. Connecting members are rod-like structures which pass through apertures formed in the mounting members and the upper housing units and allow the frame to move along the rod-like structures but is restrained in movement by resilient devices carried on the rod-like structures which along with the air bag assemblies cushion the movements of the truck which are transmitted to the frame of the bed. First and second linkage devices connect the upper housing unit and the lower housing unit of the fluid supension units and allow the vertical movement of the upper housing unit with respect to the lower housing unit while maintaining the upper housing unit in a horizontal position. The air to each bag assembly is controlled by a separate valve to allow the user to adjust the amount of air in each air bag assembly.

20 Claims, 3 Drawing Sheets

AIR SUSPENSION BED FOR VEHICLES

BACKGROUND OF THE INVENTION

1. Field of the Invention

The present invention relates in general to an air suspension bed. More particularly, but not by way of limitation, the present invention relates to an air suspension platform for bedding useful in moving vehicles such as, for example, trucks or like vehicles.

2. Description of the Related Art

In tractor-trailer trucks for hauling loads long distances, it is common practice to provide a sleeping compartment in the truck. Where the truck is being driven by a single driver, no particular problem is encountered since, in order to obtain the desired rest for the driver, the truck is necessarily stationary when the driver is sleeping or resting. However, in order to substantially increase the number of hours of operation of the truck to meet delivery schedules, two drivers are frequently assigned to a single vehicle, with one of the drivers resting and/or sleeping while the other is driving. As will be appreciated, attempting to sleep under driving conditions can be difficult, particularly when rough road conditions are encountered. The trucks experience continual vibrations, including vertical bouncing and pitch movements of a magnitude which would make it almost impossible to sleep on an ordinary non-suspended mattress. In a cab-over-engine truck or tractor unit where the cab extends well above the pitch center of the chassis, fore and aft movements of substantial magnitude occur, as well as side-to-side motion, which will all be amplified tremendously at the height of the bed above the road.

Attempts have been made in the past to provide supplemental underlying supporting means for sleeping mattresses or the like in order to provide a more comfortable supporting surface and one which is relatively more immune to rough road conditions. However, these prior art supplementary supporting systems have been less than completely satisfactory for a number of reasons, including the lack of simple and reliable cushioning means which will compensate passengers of various body weights. Moreover, the problems are compounded because of economics and because of the very limited space available at the sleeping compartment in the truck.

In the known prior art numerous implementations of suspensions systems have been taught. For example, U.S. Pat. No. 3,371,359 discloses a mattress suspension system comprising a lower support frame and an upper support frame. A pair of air suspension units are operatively connected between the lower and upper support frames. The air suspension units are simultaneously actuated and the upper support frame is automatically leveled to a neutral position regardless of the weight of the individual.

U.S. Pat. No. 3,760,436 discloses a suspension system which includes a mattress support box which is mounted for fore and aft movement relative to a frame structure by pivoted link members. Isolation of the mattress support box from vertical vibratory motions is provided by a scissors linkage. Vertical movement of the scissors linkage is controlled and restrained by a gas spring assembly operatively connected to one end of a link member.

U.S. Pat. No. 4,144,601 discloses an air ride sleeper comprising a frame which holds a mattress. At each end of the frame is a scissors-type vertical support positioned between the frame and a slide together with air cushions to provide vertical cushioning of the frame.

U.S. Pat. No. 4,196,483 discloses a portable mattress support which comprises a lower frame and an upper frame capable of being moved with respect to the lower frame by a scissor-like arrangement of intersecting levers located at each end of the support. A fluid cylinder is positioned at each end of the support to force the frames apart.

SUMMARY OF THE INVENTION

The present invention provides an air suspension bed for a vehicle which comprises a generally rectangular frame which is configured to hold a mattress or cushion. Two fluid suspension units include air bag assemblies and an upper housing unit and a lower housing unit with the upper housing unit being connected to the frame by mounting members, connecting members and resilient means. The mounting members are generally U-shaped members which are fixedly attached to the frame. Connecting members are rod-like structures which pass through apertures formed in the mounting members and the upper housing units and allow the frame to move along the rod-like structures but is restrained in movement by resilient means carried on the rod-like structures which along with the air bag assemblies cushion the movements of the truck which are transmitted to the frame of the bed. First and second linkage means connect the upper housing unit and the lower housing unit of the fluid suspension units and allow the vertical movement of the upper housing unit with respect to the lower housing unit while maintaining the upper housing unit in a horizontal position. The air to each air bag assembly is controlled by a separate valve to allow the user to adjust the amount of air in each air bag assembly.

Among the advantages offered by the present invention is the provision of a sleeping platform which is easy to install, requires minimum maintenance, is economical to manufacture and is available for sale at a reasonable cost. To provide adequate rest, the present invention is adjustable to compensate for road conditions and the user's weight and can also be adjusted to provide a desired sleeping angle, i.e., feet up or feet down.

Examples of the more important features and advantages of the invention have thus been summarized rather broadly in order that the detailed description thereof that follows may be better understood and in order that the contribution to the art may be better appreciated. There are, of course, additional features of the invention that will be described hereinafter and which will also form the subject of the claims appended hereto. Other features of the present invention will become apparent with reference to the following detailed description of a presently preferred embodiment thereof in connection with the accompanying drawing, wherein like reference numerals have been applied to like elements in which:

DESCRIPTION OF THE PREFERRED EMBODIMENT

Figure 1:
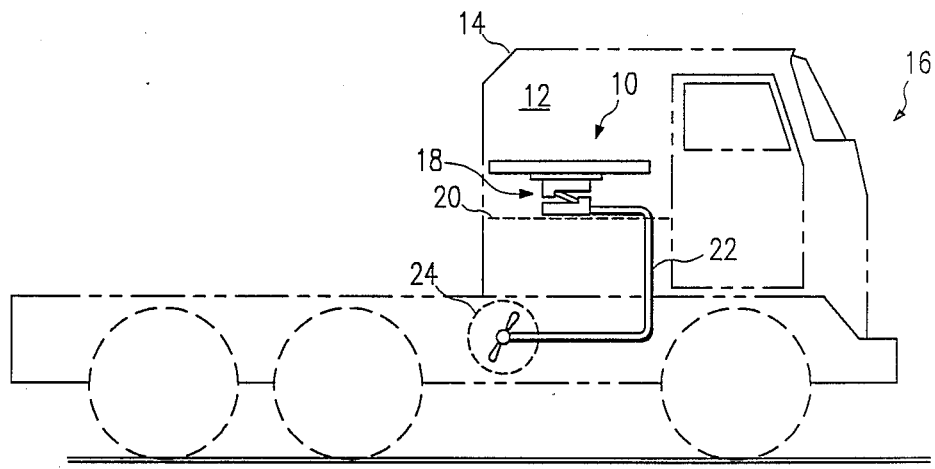
FIG. 1 a simplified side elevational view of the present invention installed in the sleeper portion of a truck cab.

Referring to the drawing and to FIG. 1 in particular, shown therein and generally designated by the reference numeral 10 is an air suspension bed that is constructed in accordance with the present invention. The air suspension bed 10 is shown installed in the support area or sleeper berth 12 within the cab 14 of a truck 16. The fluid suspension units 18 (there are at least two) are attached to the floor 20 of the support area of sleeper berth 12. Fluid is supplied to the fluid suspension units 18 through line 22 which is connected to the fluid supply means 24 of the truck 16. In the preferred embodiment, the fluid comprises air or gas.

Figure 3:
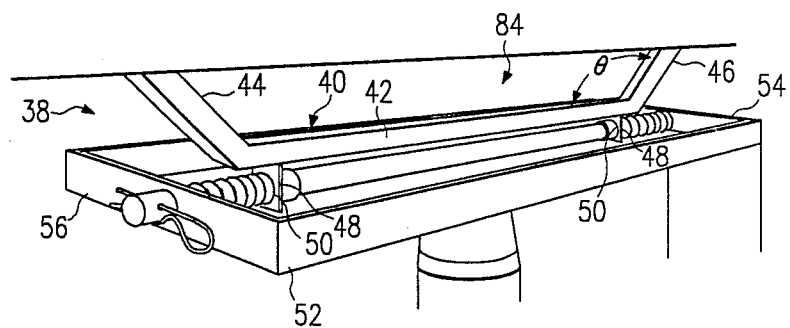
FIG. 3 is a simplified perspective view of a portion of the present invention to more clearly show connecting elements.
Figure 2:
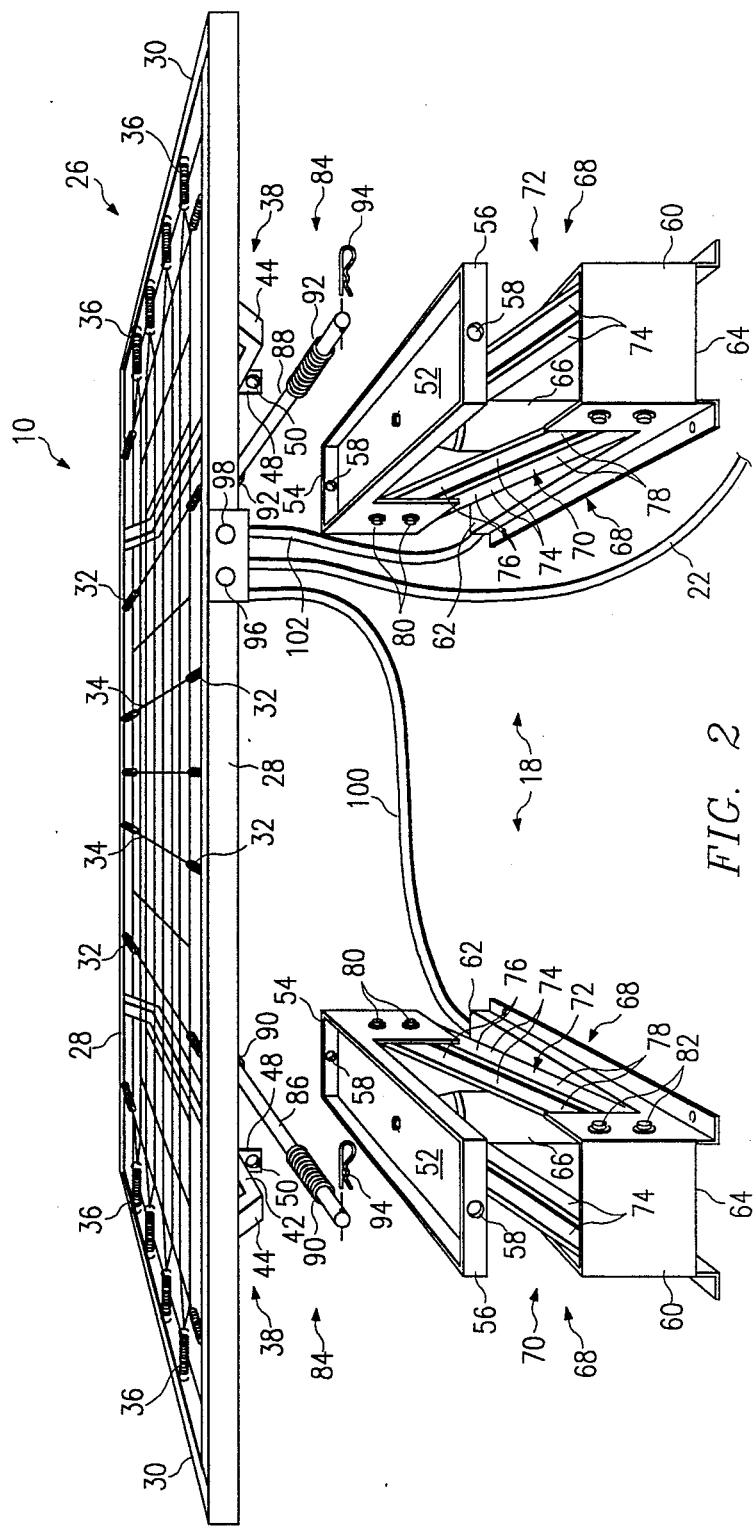
FIG. 2 is a simplified front elevational view of the present invention with portions separated to more clearly show the underlying structure.
Figure 4:
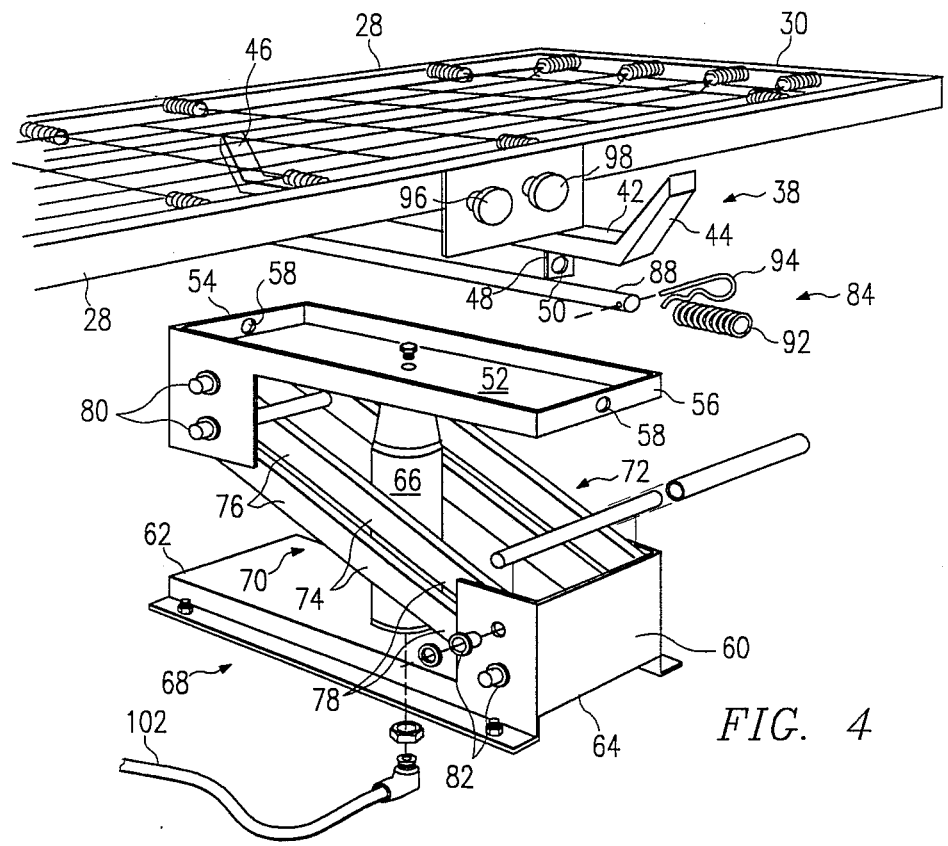
FIG. 4 is a simplified perspective view of a fluid suspension unit of the present invention with portions separated to more clearly show the unit.

With reference to FIGS. 2-4, the air suspension bed 10 comprises a generally rectangular frame 26 comprising two parallel side pieces 28 and two shorter end pieces 30. Springs 32 connect wire structure 34 to the two parallel side pieces 28 while springs 36 connect wire structure 34 to the two shorter end pieces 30. Springs 32 and 36 together with wire structure 34 provide yieldable support for a cushion or mattress (not shown) upon which a driver of the truck may sleep and/or rest.

In the preferred embodiment, at least two mounting members 38 are attached to the generally rectangular frame 26 to provide means for mounting the frame to the fluid suspension units 18. Each mounting member 38 comprises a generally U-shaped bar 40 wherein the lower portion of the U-shape is elongated with respect to a normal U. Each mounting member 38 includes a center section 42, a first end portion 44 attached to one end of the center section 42 and a second end portion 46 which is attached to the other end of the center section 42. The angle ¼ between each end portion and the center section 42 is approximately one hundred and thirty five degrees. Each mounting member 38 also includes two tabs 48 which project downwardly from said U-shaped bar 40 and are separated a predetermined distance from each other along U-shaped bar 40. Each tab 48 includes an aperture 50 therethrough of predetermined diameter. Each mounting member 38 is attached by conventional means between the parallel side pieces 28 approximately halfway between the center and the ends of generally rectangular frame 26.

In the preferred embodiment, at least two fluid suspension units 18 are positioned and operatively connected between the generally rectangular frame 26 and the floor 20 of the support area 12 for vertically controlling the position of the generally rectangular frame 26. Each fluid suspension unit 18 includes an upper housing unit 52 which is generally L-shaped with the long leg of the L being in a horizontal position with a first end 54 and a second end 56. Both first end 54 and second end 56 include an aperture 58 formed therein of predetermined diameter. Positioned below said upper housing unit 52 and in substantial alignment therewith is a lower housing unit 60 which is generally L-shaped with the long leg of the L being in a horizontal position with a first end 62 and a second end 64. Positioned between and operatively connected to the upper housing unit 52 and the lower housing unit 60 in a generally central location is an air bag assembly 66 for permitting and providing the force to allow the upper housing unit 52 to move in a vertical direction relative to the lower housing unit 60.

To provide stability and to assure that the upper housing unit 52 remains horizontal during the vertical movement thereof, connecting means 68 is operatively attached between upper housing unit 52 and lower housing unit 60. Connecting means 68 comprises a first linkage means 70 positioned on a first predetermined side of the upper housing unit 52 and the lower housing unit 60 and a second linkage means 72 positioned on a second and opposite predetermined side of the upper housing unit 52 and the lower housing unit 60. First linkage means 70 and second linkage means 72 comprise two struts 74 each having a first end 76 and a second end 78. First ends 76 of struts 74 are pivotally attached to first end 54 of the upper housing unit 52 by fastening means 80 while the second ends 78 of struts 74 are pivotally attached to second end 64 of lower housing unit 60 by fastening means 82. The two struts 74 are positioned in a parallel relationship.

Mounting means 84 operatively connects the generally rectangular frame 26 to each of the upper housing units 52 of the fluid suspension units 18. Mounting means 84 comprises a first connecting member 86, a second connecting member 88, a first resilient means 90 and a second resilient means 92. In the preferred embodiment, first and second connecting members 86 and 88 are circular rods of predetermined length and diameter. In the preferred embodiment, first and second resilient means 90 and 92 are compression springs of predetermined diameter and length.

With reference to FIGS. 2 and 3, on a predetermined one of the fluid suspension units 18, first connecting member 86 is structured of a size to fit through apertures 58 of upper housing unit 52 and through apertures 50 of U-shaped bar 40 and of a length to extend past the first end 54 and second end 56 of upper housing unit 52. First resilient means 90 are positioned on first connecting member 86 and located between tabs 48 of U-shaped bar 40 and the first end 54 and the second end 56 of upper housing unit 52 of the predetermined one of the fluid suspension units 18. Fastening means 94 maintains first connecting member 86 in operative position. On the other predetermined one of the fluid suspension units 18, second connecting member 88 is structured of a size to fit through apertures 58 of upper housing unit 52 and through apertures 50 of U-shaped bar 40 and of a length to extend past the first end 54 and second end 56 of upper housing unit 52. Second resilient means 92 are positioned on second connecting member 88 and located between tabs 48 of U-shaped bar 40 and the first end 54 and the second end 56 of upper housing unit 52 of the other predetermined one of the fluid suspension units 18. Fastening means 94 maintains second connecting member 88 in operatively position.

Figure 5:
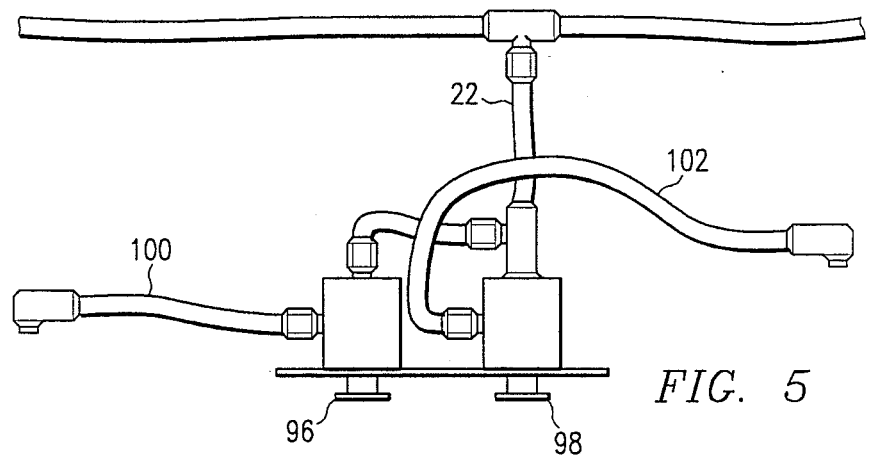
FIG. 5 is a simplified schematic of the air supply system as embodied in the present invention.

With reference to FIGS. 2 and 5, two push-pull air pressure regulator valves 96 and 98 are operatively connected to line 22 which is connected to the fluid supply means 24 of the truck 16. Push-pull air pressure regulator valve 96 is connected to a predetermined one of the fluid suspension units 18 through flexible inlet line 100 while push-pull air pressure regulator valve 98 is connected to the other fluid suspension unit 18 through flexible inlet line 102. The two regulator valves 96 and 98 are mounted on the generally rectangular frame 26 so they are within easy reach of an individual lying on the air suspension bed 10. The air supplied to each air bag assembly 66 in the fluid suspension units 18 are individually controlled and regulated by a particular regulator valve 96 or 98 which allows the user to adjust the amount of air in each individual air bag assembly 66 depending upon the weight of the user and the desired sleeping or resting angle of the user's body—feet up, feet down, etc. The desire firmness and height of the air suspension bed 10 is adjusted and set by the user while the user is resting on the air suspension bed 10. The air bag assemblies 66 dampen motion, in a reciprocal manner, of the air suspension bed 10 as the volumetric content of air in the air bag assemblies 66 is decreased or increased.

With reference to FIG. 2, the air suspension bed 10 is mounted in the truck 16 such that the longer dimension of the air suspension bed 10 lies along the width of the truck 16. The fore and aft movement (with respect to the truck 16) of the generally rectangular frame 26 is controlled, restrained and cushioned by the air bag assemblies 66 and the first and second resilient means 86 and 88 as the mounting member 38 moves along first and second connecting members 86 and 88 to minimize the effects of bumps, vibrations and accelerations and decelerations of the truck 16. The side-to-side movement (with respect to the truck 16) is controlled, restrained and cushioned by the first and second linkage means 70 and 72 and the air bag assemblies 66 to minimize the effects of bumps, vibrations and cornering or turning of the truck 16. The vertical up and down movement (with respect to the truck 16) is primarily controlled, restrained and cushioned by the air bag assemblies 66 to minimize the effects of bumps and vibrations.

In conclusion, the present invention is a relatively uncomplicated, yet highly effective air ride sleeper for use in trucks which is easy to install, requires minimum maintenance and is available at a reasonable cost.

Although the present invention has been described herein with reference to specific forms thereof, it is evident that many alternatives, modifications and variations will become apparent to those skilled in the art in light of the foregoing disclosure. Accordingly, this description is to be construed as illustrative only and is for the purpose of teaching those skilled in the art the manner of carrying out the invention. It is to be understood that the forms of the invention herewith shown and described are to be taken as presently preferred embodiments. Various changes may be made in the shape, size and arrangement of parts. For example, equivalent elements may be substituted for those illustrated and described herein, parts may be reversed, and certain features of the invention may be utilized independently of other features of the invention. It will be appreciated that various modifications, alternatives, variations, etc., may be made without departing from the spirit and scope of the invention as defined by the appended claims.

What Is claimed:

1. An air suspension bed for a vehicle having a support area, said air suspension bed comprising:
   a generally rectangular frame for supporting a cushion;
   at least two mounting members, each of said mounting members connected at predetermined locations between the longer members of said generally rectangular frame and including at least two apertures at generally opposite ends thereof;
   at least two fluid suspension units structured to be operatively connected between said frame and the support area in the vehicle for vertically controlling the position of said frame relative to said support area, each of said fluid suspension units having apertures at opposite ends thereof;
   a first connecting member slidably mounted through said at least two apertures of a predetermined one of said at least two mounting members and through said apertures of a predetermined one of at least two fluid suspension units;
   first resilient means supported by said first connecting member and operatively positioned between the apertures of said predetermined one of said at least two mounting members and the apertures of a predetermined one of at least two fluid suspension units;
   a second connecting member slidably mounted through said at least two apertures of another predetermined one of said at least two mounting members and through said apertures of another predetermined one of at least two fluid suspension units; and
   second resilient means supported by said second connecting member and operatively positioned between the apertures of another predetermined one of said at least two mounting members and the apertures of another predetermined one of at least two fluid suspension units.

2. The air suspension bed of claim 1 wherein each of said mounting members comprises a generally U-shaped bar wherein the lower portion of the U-shape is elongated with respect to a normal U.

3. The air suspension bed of claim 1 wherein each of said mounting members comprises a generally U-shaped bar having a center portion, a first end portion and a second end portion, said first end portion and said second end portion are attached to opposite ends of said center portion at an angle of approximately 135 degrees with respect to said center portion.

4. The air suspension bed of claim 1 wherein each of said fluid suspension units comprises:
   (a) an upper housing unit having apertures at opposite ends thereof;
   (b) a lower housing unit;
   (c) an air bag assembly operatively connected between said upper housing unit and said lower housing unit for permitting said upper housing unit to move in a vertical direction relative to said lower housing unit; and
   (d) connecting means operatively attached between said upper housing unit and said lower housing unit for permitting said upper housing unit to remain horizontal during the vertical travel of said upper housing unit.

5. The air suspension bed of claim 4 further including fluid supply mean and valve means operatively connected between said fluid supply means and said air bag assembly of each fluid suspension unit for selectively allowing the fluid to flow selectively from said fluid supply means to said air bag assembly of each fluid suspension unit in one position thereof, from said air bag assembly of each fluid suspension unit to atmosphere in a second position thereof or to allow no flow at all to or from said air bag assembly of each fluid suspension unit in a third position of said valve means.

6. The air suspension bed of claim 4 wherein said connecting means comprises a first linkage means positioned on a first predetermined side of said upper and lower housing units and a second linkage means positioned on a second and opposite predetermined side of said upper and lower housing units.

7. The air suspension bed of claim 6 wherein said upper housing unit has a first end and a second end and said lower housing unit has a first end and a second end and wherein said first linkage means comprises two struts each having a first end and a second end, said first ends of said two struts pivotally attached to said first end of said upper housing unit and said second ends of said two struts pivotally attached to said second end of said lower housing unit, said two struts being disposed in a parallel relationship.

8. The air suspension bed of claim 7 wherein said second linkage means comprises two struts each having a first end and a second end, said first ends of said two struts pivotally attached to said first end of said upper housing unit and said second ends of said two struts pivotally attached to said second end of said lower housing unit, said two struts being disposed in a parallel relationship.

9. The air suspension bed of claim 1 wherein said first and second connecting members each comprise a circular rod of predetermined length.

10. The air suspension bed of claim 1 wherein said first and second resilient means each comprise two compression springs.

11. An air suspension bed for a vehicle having a support area, said air suspension bed comprising:
   a generally rectangular frame for supporting a cushion;
   two mounting members, each of said mounting members connected at predetermined locations between the longer members of said generally rectangular frame and including two apertures at generally opposite ends thereof;
   two fluid suspension units structured to be operatively connected between said frame and said support area in the vehicle for vertically controlling the position of said frame relative to said support area, each of said two fluid suspension units comprising:
   (a) an upper housing unit having a first end and a second end;
   (b) a lower housing unit having a first end and a second end and disposed below said upper housing unit in substantial alignment;
   (c) an air bag assembly operatively connected between said upper housing unit and said lower housing unit for permitting said upper housing unit to move in a vertical direction relative to said lower housing unit;
   (d) two struts each having a first end and a second end, said first ends pivotally attached to said first end of said upper housing unit on a first predetermined side thereof and said second ends of said two struts pivotally attached to said second end of said lower housing unit on a first predetermined side thereof in substantial alignment with said first predetermined side of said upper housing unit, said two struts being disposed in a parallel relationship,
   (e) an additional two struts each having a first end and a second end, said first ends pivotally attached to said first end of said upper housing unit on a second and opposite predetermined side thereof and said second ends of said two struts pivotally attached to said second end of said lower housing unit on a second and opposite predetermined side thereof in substantial alignment with said second and opposite predetermined side of said upper housing unit, said additional two struts being disposed in a parallel relationship;
   a first connecting member slidably mounted through said two apertures of a predetermined one of said two mounting members and through said apertures of a predetermined one of said two fluid suspension units;
   first resilient means supported by said first connecting member and operatively positioned between the apertures of said predetermined one of said two mounting members and the apertures of a predetermined one of said two fluid suspension units;
   a second connecting member slidably mounted through said two apertures of the other predetermined one of said two mounting members and through said apertures of the other predetermined one of said two fluid suspension units; and
   a second resilient means supported by said second connecting member and operatively positioned between the apertures of the other predetermined one of said two mounting members and the apertures of the other predetermined one of said two fluid suspension units.

12. The air suspension bed of claim 11 further including fluid supply means and valve means operatively connected between said fluid supply means and said two fluid suspension units for selectively allowing the fluid to flow selectively from said fluid supply means to said two fluid suspension units in one position thereof, from said two fluid suspension units to atmosphere in a second position thereof or to allow no flow at all to or from said two fluid suspension units in a third position of said valve means.

13. An air suspension bed for a vehicle having a support area, said air suspension bed comprising;
   a generally rectangular frame for supporting a cushion;
   a least two mounting members, each of said mounting members connected at predetermined locations between the longer members of said generally rectangular frame and including at least two apertures at generally opposite ends thereof;
   at least two fluid suspension units structured to be operatively connected between said frame and said support area in the vehicle for vertically controlling the position of said frame relative to said support area, each of said at least two fluid suspension units comprising:
   (a) an upper housing unit having a first end with an aperture therein and a second end with an aperture therein;
   (b) a lower housing unit having a first end and a second end and disposed below said upper housing unit in substantial alignment;
   (c) an air bag assembly operatively connected between said upper housing unit and said lower housing unit for permitting said upper housing unit to move in a vertical direction relative to said lower housing unit;

(d) a first linkage means positioned on a first predetermined side of said upper and lower housing units and operatively attached to said upper and lower housing units, a second linkage means positioned on a second and opposite predetermined side of said upper and lower housing units and operatively attached to said upper and lower housing units for permitting said upper housing unit to remain horizontal during the vertical travel of said upper housing unit;

a first connecting member slidably mounted through said at least two apertures of a predetermined one of said at least two mounting members and through said apertures of a predetermined one of at least two fluid suspension units;

first resilient means supported by said first connecting member and operatively positioned between the apertures of said predetermined on of said at least two mounting members and the apertures of a predetermined one of at least two fluid suspension units;

a second connecting member slidably mounted through said at least two apertures of another predetermined one of said at least two mounting members and through said apertures of another predetermined one of at least two fluid suspension units; and a second resilient means supported by said second connecting member and operatively positioned between the apertures of another predetermined one of said at least two mounting members and the apertures of another predetermined one of at least two fluid suspension units.

14. The air suspension bed of claim 13 wherein each of said mounting members comprises a generally U-shaped bar wherein the lower portion of the U-shape is elongated with respect to a normal U.

15. The air suspension bed of claim 13 wherein each of said mounting members comprises a generally U-shaped bar having a center portion, a first end portion and a second end portion, said first end portion and said second end portion are attached to opposite ends of said center portion at an angle of approximately 135 degrees with respect to said center portion.

16. The air suspension bed of claim 13 further including fluid supply means and valve means operatively connected between said fluid supply means and said air bag assembly of each fluid suspension unit for selectively allowing the fluid to flow selectively from said fluid supply means to said air bag assembly of each fluid suspension unit in one position thereof, from said air bag assembly of each fluid suspension unit to atmosphere in a second position thereof or to allow no flow at all to or from said air bag assembly of each fluid suspension unit in a third position of said valve means.

17. The air suspension bed of claim 13 wherein said first linkage means comprises two struts each having a first end and a second end, said first ends of said two struts pivotally attached to said first end of said upper housing unit and said second ends of said two struts pivotally attached to said second end of said lower housing unit, said two struts being disposed in a parallel relationship.

18. The air suspension bed of claim 13 wherein said second linkage means comprises two struts each having a first end and a second end, said first ends of said two struts pivotally attached to said first end of said upper housing unit and said second ends of said two struts pivotally attached to said second end of said lower housing unit, said two struts being disposed in a parallel relationship.

19. The air suspension bed of claim 13 wherein said first and second connecting members each comprise a circular rod of predetermined length.

20. The air suspension bed of claim 13 wherein said first and second resilient means each comprise two compression springs.

* * * * *